United States Patent [19]

Hori et al.

[11] Patent Number: 5,028,758
[45] Date of Patent: Jul. 2, 1991

[54] WIRE CUT ELECTRIC DISCHARGE MACHINE

[75] Inventors: Toshimitsu Hori; Mitsutaka Sumita, both of Aichi, Japan

[73] Assignee: Mitsubishi Denki K.K., Tokyo, Japan

[21] Appl. No.: 449,164

[22] Filed: Dec. 13, 1989

[30] Foreign Application Priority Data

Jan. 11, 1989 [JP] Japan ................................. 1-2897

[51] Int. Cl.⁵ ........................ B23H 1/02; B23H 1/10; B23H 7/02; B23H 7/20
[52] U.S. Cl. .............................. 219/69.12; 219/69.14
[58] Field of Search .............. 219/69.12, 69.14, 69.13, 219/69.17, 69.18, 69.19; 364/474.04

[56] References Cited

U.S. PATENT DOCUMENTS 4,317,019  2/1982  Itoh ................................. 219/69.14
4,581,513  4/1986  Obara et al. ..................... 219/69.14

FOREIGN PATENT DOCUMENTS 61-25725  2/1986  Japan ................................. 219/69.14
178120    8/1986  Japan ................................. 219/69.14
287914   12/1987  Japan ................................. 219/69.14

Primary Examiner—Geoffrey S. Evans
Attorney, Agent, or Firm—Sughrue, Mion, Zinn, Macpeak & Seas

[57] ABSTRACT

In a wire cut electric discharge machine, a CPU stores a reference specific resistance specified for a machining solution according to a numerical control program, and causes a specific resistance control unit to control the specific resistance of the machining solution, and compares the machining solution's specific resistance thus controlled with the reference specific resistance, so that the CPU starts the electric discharge machining operation after confirming that the specific resistance has reached the reference specific resistance specified.

3 Claims, 4 Drawing Sheets

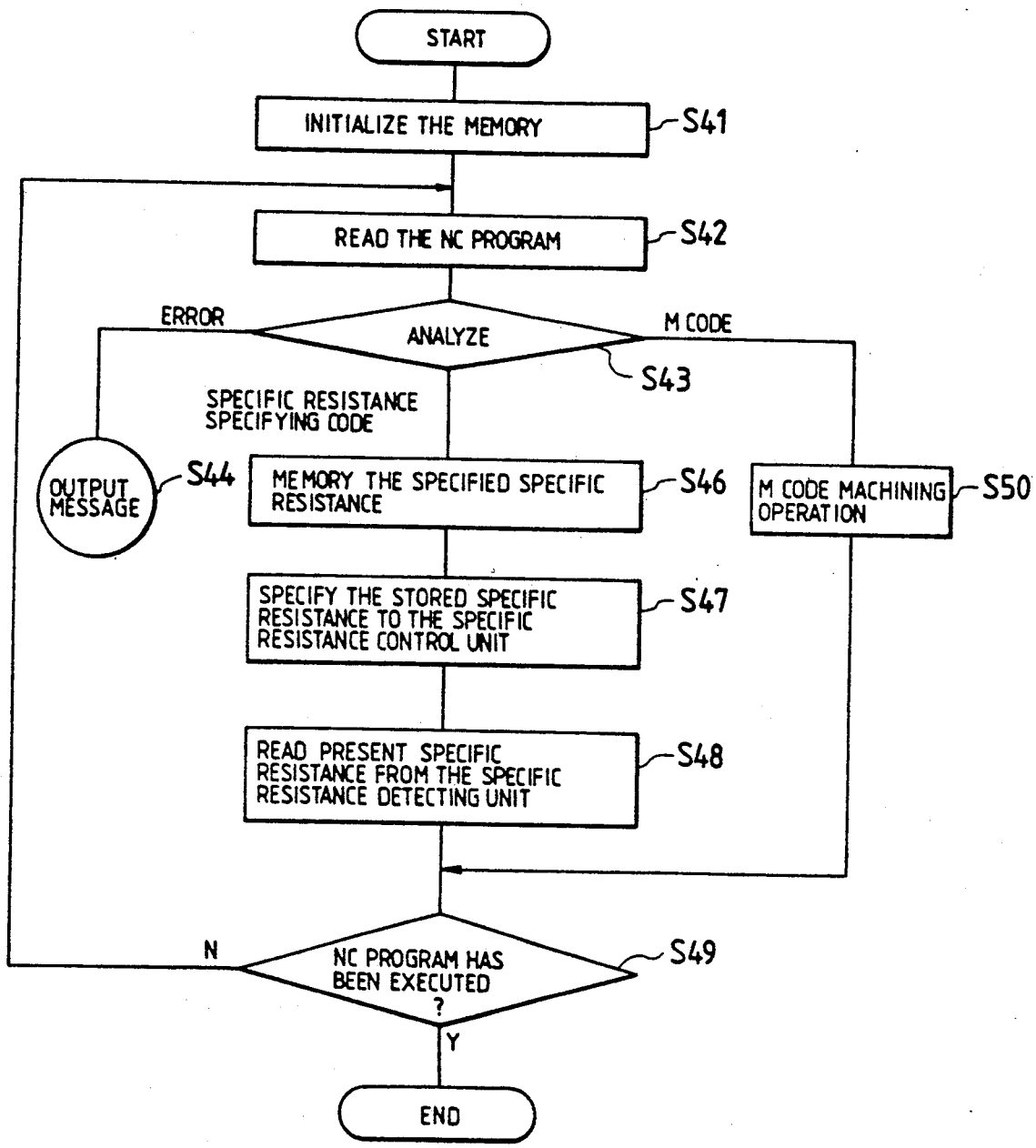

WIRE CUT ELECTRIC DISCHARGE MACHINE

BACKGROUND OF THE INVENTION

This invention relates to a wire cut electric discharge machine in which an electric discharge machining operation is carried out with a machining solution applied between the wire electrode and the workpiece, and more particularly to the control of the specific resistance of the machining solution.

FIG. 3 outlines the arrangement of a conventional wire cut electric discharge machine. In FIG. 3, reference numeral 1 designates a memory for storing various data concerning a wire cut electric discharge machining operation; 2, a paper tape input/output unit for punching a paper tape and reading the data punched in a paper tape; 3, a CRT (cathode ray tube) for displaying a variety of pieces of data; 4, a keyboard for inputting data and instructions; 5, an input/output unit for transmitting data to and receiving data from a flexible disk 6 which stores data provided through the input/output unit 5; and 7, arithmetic means for processing the data which are transferred from the flexible disk 6, through the paper tape input/output unit 2, the keyboard 4 and the input/output unit 5, and executing the operations shown in FIG. 4, a flow chart (the arithmetic means 7 is hereinafter referred to as a "CPU", when applicable). The components 1 through 7 form a numerical control device.

Further in FIG. 3, reference numeral 9 designates a specific resistance detecting unit for detecting the specific resistance of a machining solution; 10, a specific resistance control unit operating to maintain the specific resistance of a machining solution constant; 11, a specific resistance meter for indicating the specific resistance of a machining solution; 12, a data transmitting bus; 15, a wire electrode; 16, wire guides for supporting the wire electrode 15; 17, a nozzle for jetting a machining solution; 19, a machining solution used for machining; 20, a filter for a machining solution; 21, a machining solution passed through the filter 20; 22, a pump for pumping the machining solution out of a machining solution vessel 24; and 30, a wire cut electric discharge machine body.

The operation of the conventional wire cut electric discharge machine thus constructed will be described with reference to the flow chart of FIG. 4.

Prior to analysis of a numerical control program (hereinafter referred to as "an NC program", when applicable) inputted by the paper tape input/output unit 2 or inputted by the input/output unit 5 using the flexible disk 6, the CPU 7 operates to initialize the memory 1 which is used to store specific resistance specifying codes (Step S41). After the initialization of the memory 1, the CPU 7 reads the NC program from the input/output unit 5 or the paper tape input/output unit 2 (Step S42), and analyzes it line by line beginning from the first line thereby to determine whether it includes an error or not, and whether it includes codes for driving the electric discharge machine body or a specific resistance specifying code (Step S43). When an error is included, the CPU displays an error message on the CRT, to suspend the analysis (Step S44). When a specific resistance specifying code is encountered, then the CPU 7 operates to store the specific resistance thus specified in the memory 1 which has been initialized in Step S41 (Step S46). The specific resistance stored in Step S46 is applied, as a signal, to the specific resistance control unit 10. Thereafter, the CPU 7 detects the specific resistance with a sensor 18 which is provided for the specific resistance control unit 10 adapted to control the filtered machining solution, and operates to cause the specific resistance meter 11 or the CRT 3 to display the specific resistance of the filtered machining solution 21 (Step S48). Then, the CPU 7 determines whether or not the NC program step has been executed (Step S49). If the execution of the NC program step has not been accomplished yet, then the next NC program step is effected; that is, the M code for driving the electric discharge machine body is utilized, and the pump 22 is driven to jet the filtered machining solution 21 to the wire electrode 15 through the nozzle 17 (Step S50).

As was described above, in the conventional wire cut electric discharge machine, the specific resistance is displayed on the CRT or the specific resistance meter; however, the CPU does not refer to the set value for specific resistance, and the electric discharge machining operation may be started before the set value is reached. In order to overcome the difficulty, the operator must confirm that the specific resistance displayed on the specific resistance meter or the CRT has reached the set value before the machining operation is started.

SUMMARY OF THE INVENTION

Accordingly, an object of this invention is to eliminate the above-described difficulty accompanying a conventional wire cut electric discharge machine.

More specifically, an object of the invention is to provide a wire cut electric discharge machine in which, the CPU starts an electric discharge machining operation after confirming the specified resistance has reached a specified value, and the specific resistance can be automatically controlled.

The foregoing object and other objects of the invention has been achieved by the provision of a wire cut electric discharge machine which, according to the invention, comprises: machining solution supplying means for jetting a machining solution to a wire electrode, and collecting and filtering the machining solution; specific resistance control means for controlling the machining solution so that the specific resistance of the machining solution filtered by the machining solution supplying means reaches a reference specific resistance provided therefor; specific resistance detecting means for detecting the specific resistance of the machining solution thus filtered, to output a detection signal; memory means for storing the reference specific resistance; input means for inputting a numerical control program including a specific resistance specifying code and a machining procedure for an electric discharge machining operation; and arithmetic means for reading and analyzing the numerical control program, storing as the reference specific resistance in the memory the specific resistance obtained by analyzing the numerical control program concerning the specific resistance specifying code, and starting the processing of the numerical control program concerning the machining procedure after confirming that the specific resistance represented by the detection signal provided by the specific resistance detecting means has reached the reference specific resistance stored in the memory.

In the electric discharge machine, prior to an electric discharge machining operation, the arithmetic means, namely, a CPU operates to initialize the memory adapted to store the reference specific resistance of the machining solution, and upon reception of a numerical control program including a specific resistance specifying code and a machining procedure for the electric discharge machining operation, the CPU reads and analyzes the numerical control program line by line. In the case where the code for a specific resistance is specified, the CPU causes the memory to store the specified specific resistance, and applies the specified specific resistance to the specific resistance specifying means. Thereupon, the specific resistance control means controls the resistance of the filtered machining solution in the machining solution supplying means so that the specific resistance of the filtered machining solution reaches the specified specific resistance. On the other hand, the specific resistance detecting means detects the specific resistance of the machining solution applies it to the CPU. The CPU starts the electric discharge machining operation after ensuring that the specific resistance of the filtered machining solution has reached the specified specific resistance.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

FIG. 4 is a flow chart for a description of the operation of the conventional wire cut electric discharge machine shown in FIG. 3.

DETAILED DESCRIPTION OF THE INVENTION

Figure 1:
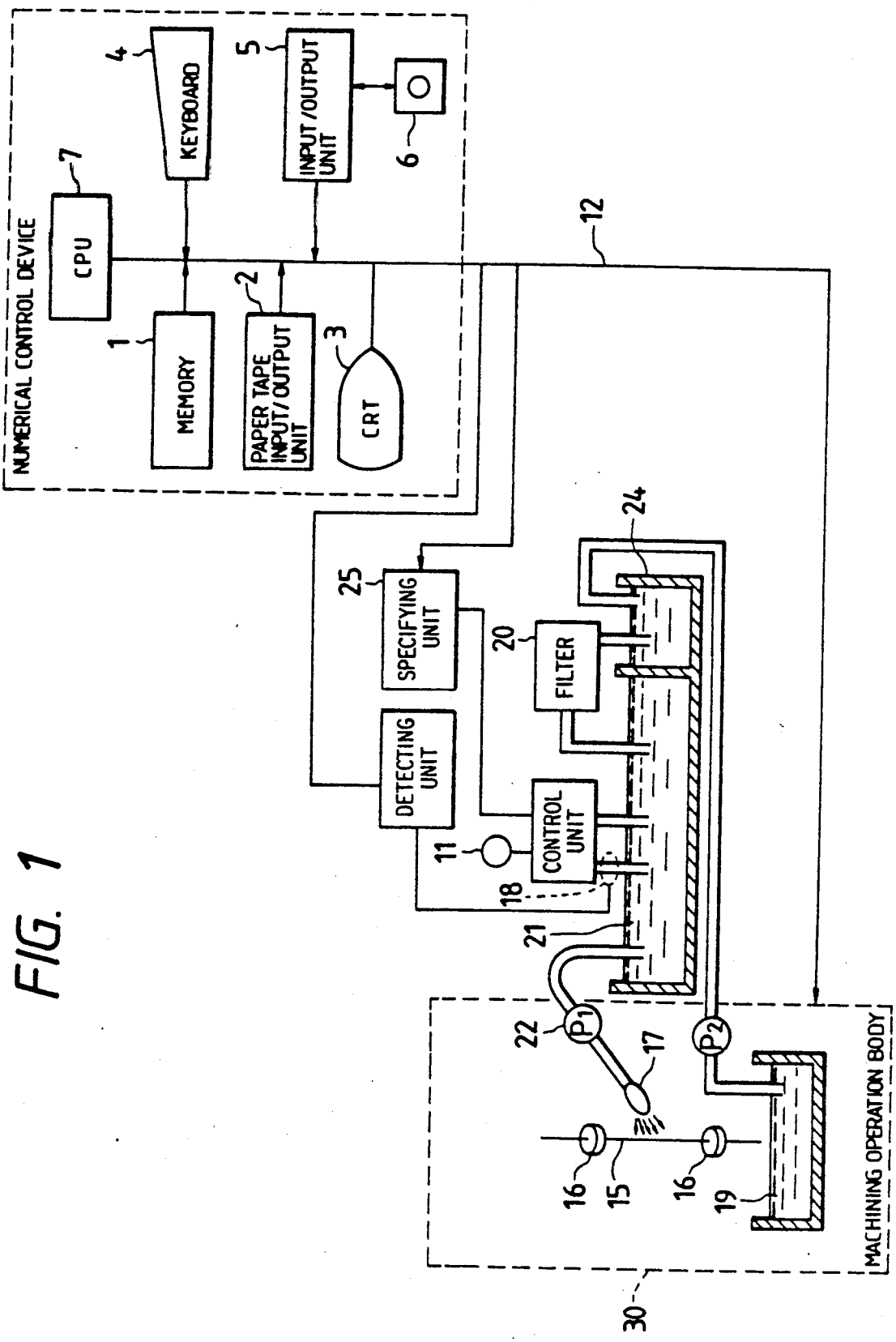
FIG. 1 is an explanatory diagram showing the arrangement of one example of a wire cut electric discharge machine according to this invention.
Figure 3:
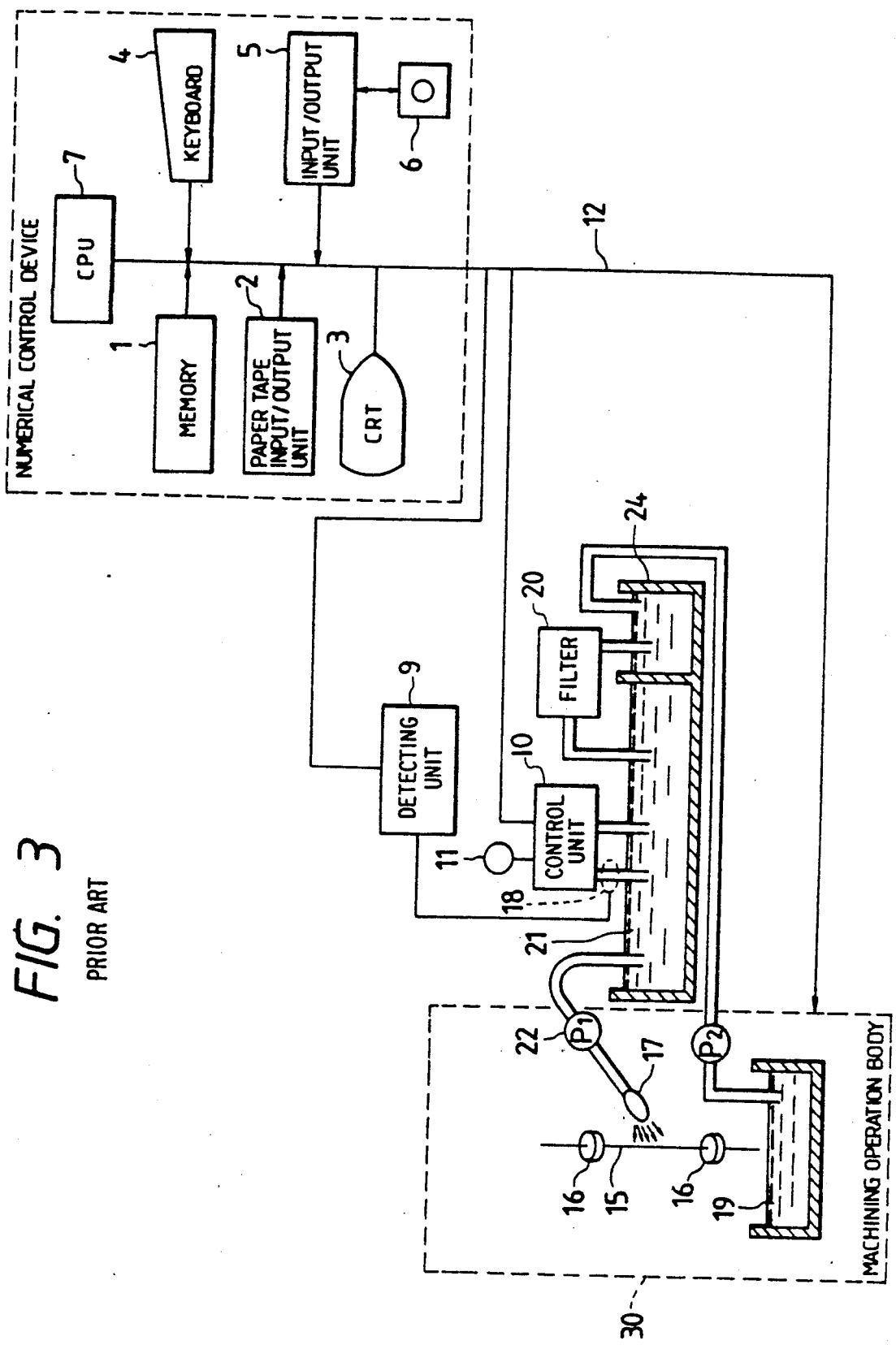
FIG. 3 is an explanatory diagram showing the arrangement of one example of a conventional wire cut electric discharge machine.

One example of a wire cut electric discharge machine according to this invention will be described with reference to FIG. 1. As is apparent from comparison of FIG. 1 with FIG. 3, the wire cut electric discharge machine according to the invention can be obtained by adding a specific resistance specifying unit 25 to the conventional wire cut electric discharge machine shown in FIG. 3. The specific resistance specifying unit 25 is used to specify a specific resistance for a machining solution.

With the wire cut electric discharge machine thus constructed, before an electric discharge machining operation, the machining solution must be jetted through the nozzle 17 or the filtered machining solution must be stirred using the specific resistance control unit 10 until the specific resistance of the machining solution reaches a target value, because the electrolyte contained in the machining solution allows the flow of electric current, and depending on the current the specific resistance of the machining solution is changed; that is, the specific resistance affects the machining performance of the electric discharge machine.

Figure 2:
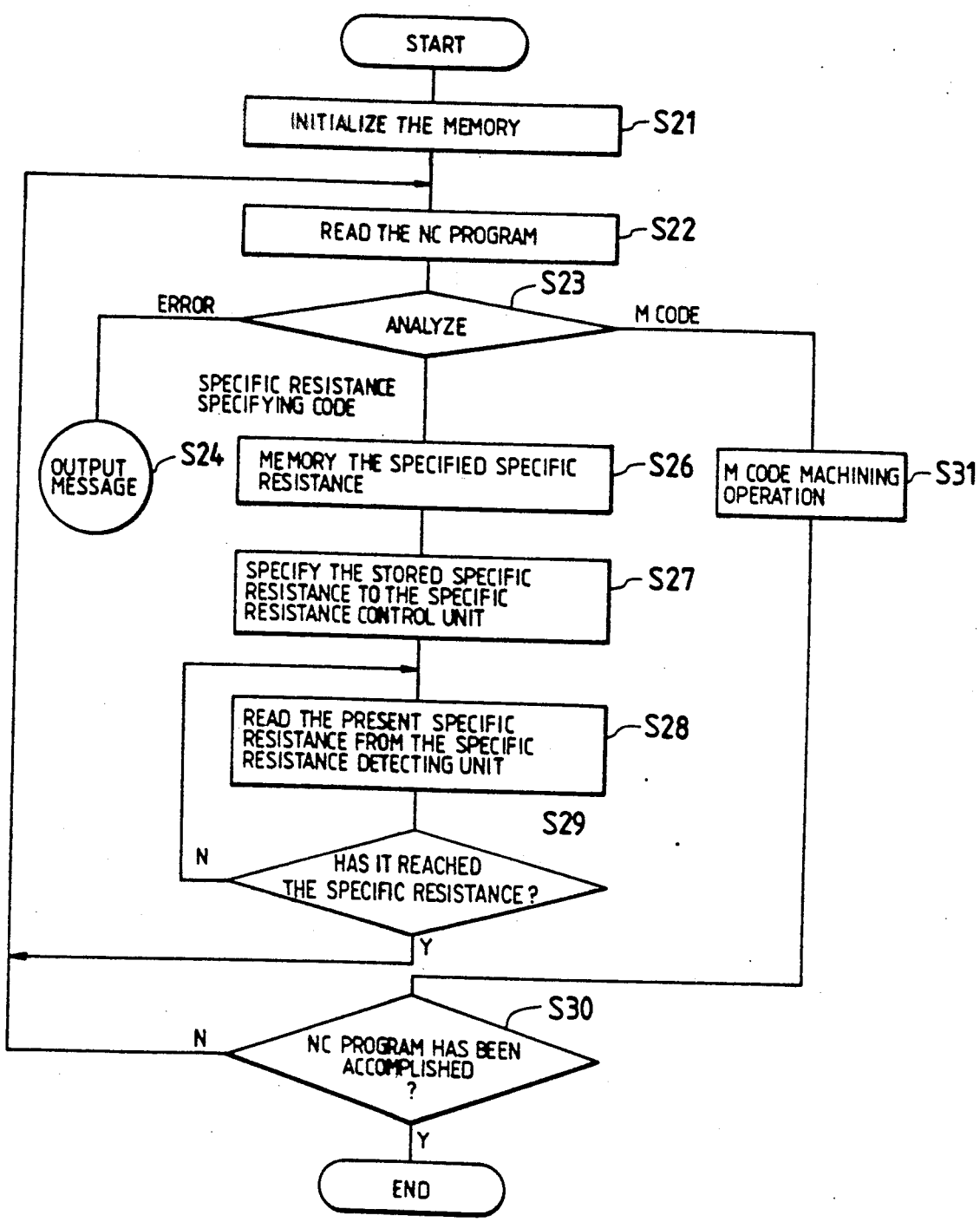
FIG. 2 is a flow chart for a description of the operation of the electric discharge machine shown in FIG. 1.

The operation of the wire cut electric discharge machine according to the invention will be described with reference to FIG. 2, a flow chart.

Prior to the analysis of a numerical control program (hereinafter referred to as "an NC program", when applicable) provided by the paper tape input/output unit 2 or by the input/output device 5, the CPU 7 operates to initialize the memory 1 which is used to store specific resistance specifying codes according to the invention (Step S21). After the initialization of an memory 1, the CPU 7 reads the NC program from the input/output unit 5 or the paper tape input/output unit 2, which program includes a specific resistance specifying code and a processing operation (Step S22). The program is analyzed line by line beginning from the first line thereby to determine whether it includes an error and to determine whether it contains an NC code (an M code) for driving the electric discharge machine body or a specific resistance specifying code according to the invention (Step S23). When an error is included, the CPU displays an error message on the CRT, to suspend the analysis (Step S44). When a specific resistance specifying code according to the invention is encountered, then the CPU 6 operates to store the specific resistance thus specified in the memory 1 which has been initialized in Step S21 (Step S26). The specific resistance thus stored is applied, as a signal, to the specific resistance specifying unit 25 (Step S27). In response to the signal, the specific resistance control unit 10 controls the resistance of the filtered machining solution. Thereafter, the CPU 7 detects the specific resistance with the sensor 18 which is provided for the specific resistance control unit 10 adapted to control the filtered machining solution 21, and reads the specific resistance of the present filtered machining solution 21 through the specific resistance detecting unit 9 (Step S28). Then, it is determined whether or not the specific resistance of the filtered machining solution 21 has reached the specific resistance specified by comparing it with the specific resistance stored in the memory 1 in Step S26. When it has reached the specific resistance stored in the memory 1, Step S22 is effected; if not, Step S28 is repeatedly effected; that is, the specific resistance is repeatedly detected until it reaches the specific resistance stored in the memory 1 (Step S29).

When it is determined that the specific resistance of the machining solution has reached the specified specific resistance in Step S29, then the CPU 7 reads the next NC program step (Step S22), and analyzes it (Step S23). In the case of an M code, the CPU 7 operates to cause the pump 22 to pump up the filtered machining solution 21 to jet it to the wire electrode 15 through the nozzle 17, and starts an electric discharge machining operation (S31). Thereafter, it is determined whether or not the execution of the M code of the NC program has been accomplished (Step S30). When it has not been accomplished yet, the CPU 7 reads the next M code of the NC program, and analyzes it. Upon detection of the termination code, the operation is ended.

In the above-described embodiment, the specific resistance specifying unit 25 is employed to specify a specific resistance; however, it should be noted that the invention is not limited thereto or thereby. That is, the provision of the specific resistance specifying unit may be eliminated by causing the CPU to output a signal which specifies a specific resistance for the machining solution.

Furthermore, in the above-described embodiment, the specific resistance detecting unit 9 detects the specific resistance of the filtered machining solution 21 below the specific resistance control unit 10; however, the detection may be carried out before the position where the filtered machining solution 21 is jetted.

While the invention has been described with reference to the wire cut electric discharge machining operation, the technical concept of the invention may be applied to other electric discharging machining operations using a machining solution.

As was described above, in the wire cut electric discharge machine according to the invention, the specific resistance control unit 10 controls the filtered machining solution 21 in the machining solution supplying unit so that the specific resistance of the machining solution reach the reference value stored in the memory, the CPU reads the specific resistance from the specific resistance detecting unit to determine whether or not the specific resistance thus read has reached the reference value stored in the memory, and starts the electric discharge machining operation after ensuring that the specific resistance of the filtered machining solution 21 has reached the reference value. Thus, the electric discharge machining operation can be automated according to the invention. Furthermore, an electric discharge machining operation will never be started until the specific resistance of the filtered machining solution 21 reaches the reference value stored in the memory. Therefore, with the wire cut electric discharge machine of the invention, the workpiece can be machined with high accuracy.

What is claimed is:

1. A wire cut electric discharge machine comprising:
   machining solution supplying means for jetting a machining solution to a wire electrode, and collecting and filtering said machining solution;
   specific resistance control means for controlling said machining solution so that the specific resistance of said machining solution filtered by said machining solution supplying means reaches a reference specific resistance provided therefor;
   specific resistance detecting means for detecting the specific resistance of said machining solution thus filtered, to output a detection signal;
   memory means for storing said reference specific resistance;
   input means for inputting a numerical control program including a specific resistance specifying code and a machining procedure for an electric discharge machining operation; and
   arithmetic means for reading and analyzing said numerical control program, storing as said reference specific resistance in said memory the specific resistance obtained by analyzing said numerical control program concerning said specific resistance specifying code, and starting the processing of said numerical control program concerning said machining procedure after confirming that the specific resistance represented by said detection signal provided by said specific resistance detecting means has reached said reference specific resistance stored in said memory.

2. A wire cut electric discharge machine of claim 1, in which said arithmetic means comprises a specific resistance specifying unit used to specify a specific resistance for said machining solution.

3. A machining solution specific resistance verification method for use with a wire cut electric discharge machine that jets said machining solution between a wire electrode and a workpiece comprising:
   establishing a reference specific resistance value;
   detecting the present specific resistance of said machining solution;
   comparing said present specific resistance to said reference specific resistance value; and
   commencing an electric discharge machining operation using said wire cut electric discharge machine when said present specific resistance equals said reference specific resistance value.

* * * * *